(12) United States Patent
Reepen et al.

(10) Patent No.: US 11,870,170 B2
(45) Date of Patent: Jan. 9, 2024

(54) ON-BOARD POWER SUPPLY CONNECTOR

(71) Applicant: Auto-Kabel Management GmbH, Hausen i.W. (DE)

(72) Inventors: Richard Reepen, Moers (DE); Rene Mathews, Neuss (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 18/041,660

(22) PCT Filed: Jul. 7, 2021

(86) PCT No.: PCT/EP2021/068834
§ 371 (c)(1),
(2) Date: Feb. 14, 2023

(87) PCT Pub. No.: WO2022/037843
PCT Pub. Date: Feb. 24, 2022

(65) Prior Publication Data
US 2023/0246360 A1   Aug. 3, 2023

(30) Foreign Application Priority Data
Aug. 17, 2020   (DE) ..................... 10 2020 004 993.1

(51) Int. Cl.
*H01R 13/506*   (2006.01)
*H01R 12/72*   (2011.01)
*H01R 13/52*   (2006.01)

(52) U.S. Cl.
CPC ......... *H01R 12/721* (2013.01); *H01R 13/506* (2013.01); *H01R 13/5219* (2013.01); *H01R 2201/26* (2013.01)

(58) Field of Classification Search
None
See application file for complete search history.

(56) References Cited

U.S. PATENT DOCUMENTS

| 3,091,748 A | 5/1963 | Takes et al. |
| 3,681,739 A * | 8/1972 | Kornick ................. H01R 24/40 439/314 |

(Continued)

FOREIGN PATENT DOCUMENTS

| CN | 203423322 U | 2/2014 |
| CN | 204216355 U | 3/2015 |

(Continued)

OTHER PUBLICATIONS

German Patent Office, Office Action, Application No. 10 2020 004 993.1, dated Mar. 11, 2021, 8 pages (in German).

(Continued)

*Primary Examiner* — Tho D Ta
(74) *Attorney, Agent, or Firm* — Sunstein LLP

(57) ABSTRACT

On-board power supply connector, in particular for high-voltage on-board power supplies, comprising, a first connection part arranged in a first housing part, the first housing part having a longitudinal extension along a longitudinal axis and having an end-face opening, and the first connection part being mounted in the first housing part such that it can move along the longitudinal axis, a second connection part arranged in a second housing part, the second housing part having a longitudinal extension along a longitudinal axis and having an end-face opening, characterized in that, in the connected state of the connector, a fastening lever which can be pivoted about an axis perpendicular to the longitudinal axis is arranged on one of the housing parts and, in the connected state of the connector, engages with a fastening means on the other housing part, wherein, in the connected state of the connector, the longitudinal axes of the first and second housing parts extend collinearly and the second housing part is fixed relative to the first housing part at least in the longitudinal direction and the second connection part is in mechanical contact with the first connection (Continued)

part, characterized in that the first connection part is resiliently mounted in the first housing part along the longitudinal axis by a spring element.

16 Claims, 13 Drawing Sheets

(56) References Cited

U.S. PATENT DOCUMENTS

| | | | |
|---|---|---|---|
| 4,580,862 A | | 4/1986 | Johnson |
| 4,697,859 A * | | 10/1987 | Fisher, Jr. .......... H01R 13/6315 439/246 |
| 6,224,407 B1 * | | 5/2001 | Duquerroy ......... H01R 13/6315 439/188 |
| 6,558,177 B2 * | | 5/2003 | Havener ................ H01R 24/50 439/246 |
| 9,979,132 B1 * | | 5/2018 | Flaherty, IV ...... H01R 13/7032 |
| 10,978,840 B2 * | | 4/2021 | Paynter .................... H01R 9/05 |
| 11,025,008 B2 * | | 6/2021 | Kim .................... H01R 13/052 |

FOREIGN PATENT DOCUMENTS

| | | |
|---|---|---|
| DE | 197 11 376 A1 | 12/1997 |
| DE | 10 2010 040 787 A1 | 3/2012 |
| DE | 10 2017 205 454 A1 | 6/2018 |
| DE | 10 2018 009 478 A1 | 6/2020 |
| FR | 2754645 A1 | 4/1998 |
| WO | 2018/214239 A1 | 11/2018 |
| WO | 2019/072513 A1 | 4/2019 |

OTHER PUBLICATIONS

International Searching Authority/EP, International Search Report and Written Opinion of the International Searching Authority, Application No. PCT/EP2021/068834, dated Oct. 18, 2021, 13 pages.

* cited by examiner

ON-BOARD POWER SUPPLY CONNECTOR

CROSS-REFERENCE TO RELATED APPLICATIONS

This application is the national phase entry of international patent application no. PCT/EP2021/068834, filed Jul. 7, 2021 and claims the benefit of German patent application No. 10 2020 004 993.1, filed Aug. 17, 2020, the disclosures of which are incorporated herein by reference in their entirety.

TECHNICAL FIELD

The subject matter relates to an on-board power system connector, in particular for an on-board power system of a motor vehicle, in particular in a passenger car, truck or other motor-driven motor vehicle. The on-board power system connector is particularly suitable for high-voltage on-board power systems.

BACKGROUND ART

In automotive applications, there are various types of high-voltage on-board networks. On the one hand, these can be on-board networks with voltages of over 12V, for example 24V or 48V. Due to the increasing number of comfort consumers within motor vehicles, the conception is gaining ground that on-board supply networks with 48V are advantageous. However, these require different plug connections than are necessary for conventional 12V onboard networks. On the other hand, a high-voltage onboard network can also be understood as an onboard network for the drive train, especially in vehicles powered by electric motors. The powertrain is often operated with voltages of several 100V, for example about 400V. In addition to high voltages, high currents are also to be expected on these on-board power supplies, since considerably higher power is required to drive the motor vehicle than to operate the comfort consumers. Such on-board power supplies also place particularly high demands on connectors.

Particularly in the highly dynamic automotive applications, high demands are placed on the mechanical stability of the on-board power supply connectors. On-board connectors must permanently guarantee a stable and electrically flawless connection. Due to the sometimes high currents, there are also high demands on the contact resistances of such connectors in order to keep the heat loss at the junction low. This requires large-area contact surfaces between the connection partners.

To ensure a permanently stable, electrically flawless connection with a low contact resistance and high stability in the face of dynamic loads, an on-board power system connector according to the present invention is proposed.

SUMMARY OF THE INVENTION

This on-board power supply connector has a first housing part. A first connection part is arranged in this first housing part. The housing part has a longitudinal extension along a longitudinal axis. The housing part is formed in particular from side walls as well as a base and an open cover. Whenever side walls are mentioned here and in the following, the singular is always meant. The lid may also be referred to as the end face. The housing is formed in particular in one piece from walls, base and end face. The housing part has an opening on the end face. The connection part arranged inside the housing part is arranged in the housing part so as to be movable along the longitudinal axis. The connection part can perform a translational movement in the housing part along the longitudinal axis.

In addition to the first housing portion, the connector also has a second housing portion. A second connection part is arranged within this second housing part. Also like the first housing part, the second housing part is formed from side walls, an open lid and a base.

The lid may also be referred to as the end face. In particular, the housing is formed in one piece from walls, base and end face. The housing part has an opening on the end face. The connection part arranged inside the housing part is arranged in the housing part preferably fixed to the longitudinal axis.

For connecting, one of the housing parts is inserted into the other housing part and the connection parts come into electrical contact with each other. For this purpose, the connection parts are formed from and/or coated with electrically conductive material. In particular, the connection parts can be formed from a copper material or an aluminum material. A coating of the connection parts, in particular on the surfaces with which the connection parts come into contact with each other in the connected state, is also conceivable. A metallic coating, in particular tin plating, is possible.

In the connected state of the connector, the housing parts are inserted into one another in such a way that their longitudinal axes are preferably collinear with one another. Furthermore, the second housing part is fixed relative to the first housing part at least in the longitudinal direction and the second connection part is in mechanical contact with the first connection part. In this case, contact surfaces of the connection parts are in contact with each other. Contact surfaces are in particular, on the one hand, an outer lateral surface of a connection part that is in direct contact with an inner lateral surface of another connection part.

To establish a good electrical connection, the contact surfaces must be firmly connected to each other. Furthermore, for dynamic stability, fixation of this connection must be ensured even in dynamic environments. For this purpose, it is proposed that the first connection part is spring-mounted in the first housing part along the longitudinal axis by a spring element. When the second housing part is connected to the first housing part, the first connection part and the second connection part come into contact with each other. The mating of the housing parts results in a pressing force of the second housing part against the first housing part along the longitudinal axis against the spring force of the spring element. The spring element is thus compressed in the connected state, causing a permanent spring force to act on the connection between the two connection parts. The first connection part is moved longitudinally in the first housing part against the spring force.

According to one embodiment, it is proposed that one of the connection parts is a sleeve-shaped receptacle and one of the connection parts is a rod-shaped plug-in element congruent with the receptacle. The receptacle and the plug-in element are preferably arranged centrally in the respective housing parts and each extend in the longitudinal direction. The receptacle and the plug-in element are preferably on the center axis of the respective housing part.

The sleeve-shaped receptacle serves to receive the plug-in element. An inner lateral surface of the sleeve-shaped receptacle comes into direct contact with an outer lateral surface of the plug-in element in the connected state. The housing part, which has the connection part with the sleeve-shaped receptacle, is preferably inserted into the housing part, which has the connection part with the rod-shaped plug-in element. An annular space is formed between the inner lateral surface of the housing part and the rod-shaped plug-in element. The other housing part together with the sleeve-shaped receptacle is inserted into this annular space. The housing part with the sleeve-shaped receptacle is inserted into the front opening of the housing part with the plug-in element. The plug-in element is inserted into the front opening of the housing part with the sleeve-shaped receptacle. The outer surface of the plug-in element thus comes into contact with the inner surface of the sleeve-shaped receptacle.

It is proposed that, in the connected state, the plug-in element is inserted in the receptacle and the spring element is compressed. The spring element is in particular a steel spring, preferably a compression spring. However, the spring element can also be formed from a plastic. The spring element can be resiliently compressed along the longitudinal axis, whereby in the compressed state the spring element exerts a force on the connection part in such a way that the latter is pressed against the respective other connection part. Since in the connected state the housing parts are fixed to each other in the longitudinal direction, the spring force acts on the contact surface between the two connection parts.

According to one embodiment, it is proposed that in the connected state one of the housing parts is at least partially inserted into the front opening of the other housing part. This insertion brings the sleeve-shaped receptacle and the plug-in element into direct contact with each other.

The sleeve-shaped receptacle preferably extends within the housing part in the longitudinal direction along the longitudinal axis thereof. The sleeve-shaped receptacle has tubular side walls as well as a bottom at one end face and an opening at the other end face. The end opening of the sleeve-shaped receptacle is in the direction of the end opening of the housing part. The base is preferably closed. The housing part has a shape surrounding the sleeve-shaped receptacle and is thereby also preferably sleeve-shaped with tubular side walls.

The rod-shaped plug-in element has a longitudinal extension. Within the housing part in which the rod-shaped plug-in element is installed, the plug-in element extends in its longitudinal direction along the longitudinal axis of the housing part. Preferably, the plug-in element has a tubular outer envelope surface which is congruent with the tubular inner envelope surface of the sleeve-shaped receptacle. The tubular plug-in element is surrounded by the housing part, wherein the side walls of the housing part, in particular the inner lateral surface of the side walls of the housing part, extend parallel to the outer lateral surface of the plug-in element. In particular, the outer lateral surface of the housing part with the plug-in element is congruent with an inner lateral surface of the housing with the sleeve-shaped receptacle. Thus, the housing with the sleeve-shaped receptacle can be inserted into the housing with the plug-in element and the housing parts abut each other with their inner and outer lateral surfaces.

In the connected state, the first housing part is inserted into the front opening of the second housing part or the second housing part is inserted into the front opening of the first housing part.

According to an embodiment, it is proposed that the receptacle tapers, in particular tapers conically, from a front opening towards a bottom. This tapering of the receptacle leads to a better form fit between the plug-in element and the receptacle. In particular, the plug-in element can be inserted into the receptacle to such an extent that the contact surfaces, i.e. the outer lateral surface of the plug-in element and the inner lateral surface of the receptacle, come into contact with each other in any case. The taper, in particular the conical taper, serves as tolerance compensation, since direct mechanical contact between the plug-in element and the receptacle is always ensured in the inserted state.

It is also proposed that the plug-in element tapers towards its end face, in particular tapers conically. The plug-in element and receptacle are preferably shaped congruently to one another and, in particular, have tapers extending congruently to one another, so that the plug-in element, when inserted in the receptacle, rests with its outer lateral surface against the inner lateral surface of the receptacle. The spring element results in a contact pressure of the plug-in element on the receptacle or vice versa. The spring force acting in the longitudinal axis presses the plug-in element and the receptacle against each other in such a way that their contact surfaces are firmly connected to each other.

According to one embodiment, it is proposed that, in the connected state, an inner lateral surface of the receptacle and an outer lateral surface of the plug-in element are in direct contact with each other. This direct contact ensures good electrical conductivity at the junction. Ohmic losses are reduced, in particular due to large contact areas ensured by the congruent shell surfaces.

According to one embodiment, it is proposed that a spacer extends in the receptacle from the bottom of the receptacle to a front opening of the receptacle. The opening of the housing part extending in the longitudinal axis and the opening of the sleeve-shaped receptacle extending in the longitudinal axis run in particular collinearly. The spacer may be arranged on the central axis. The spacer also extends along the longitudinal axis from the base to the end opening of the receptacle. The spacer can be rod-shaped. In the sleeve-shaped receptacle, an annular space is formed between the spacer and the inner lateral surface of the sleeve-shaped receptacle. The spacer serves to ensure that the plug-in element can only be inserted into the receptacle to a certain extent. This prevents too tight locking between the receptacle and the plug-in element.

In order to be able to insert the plug-in element into the receptacle, the latter must accommodate the spacer. For this purpose, the plug-in element has a recess extending from the end face of the plug-in element in the longitudinal axis. The housing part with the plug-in element also has a receptacle within which the plug-in element is arranged.

The plug-in element also extends along the longitudinal axis. The longitudinal axes of the receptacle of the housing part and the plug-in element are preferably collinear. Within the plug-in element, the recess, for example in the form of a hole, can then be provided on the center axis of the plug-in element.

The spacer engages in this recess in the installed state. That is, when the plug-in element is inserted into the sleeve-shaped receptacle, the spacer is simultaneously pushed into the recess. The recess has a certain depth within the plug-in element. A stop for the spacer is formed within the recess, for example by the base. This ensures that the plug-in element is inserted into the sleeve-shaped receptacle only to a certain depth, namely until the spacer abuts the stop of the recess.

According to an embodiment, it is proposed that the first connection part is connected to a flexible cable. The first connection part is spring mounted to the spring element and translationally displaceable within the housing part along the longitudinal axis. In order not to influence this displaceability too much by the cable connected to the connection part, it is proposed that the flexible cable is inserted into the interior of the first housing part through a bushing and is mounted movably in the bushing along the longitudinal axis, or that the first connection part is led out of the interior of the housing part through a bushing and is mounted movably in the bushing along the longitudinal axis. In particular, the bushing has a longitudinal extension along a longitudinal axis which is parallel, preferably collinear, to the longitudinal axis of the housing part or the receptacle. The bushing preferably extends parallel to the longitudinal axis, so that displacement of the connection part against the spring element along the longitudinal axis is not impeded by displacement of the cable or the connection part in the bushing. The direction of displacement of the cable or the connection part in the bushing is preferably parallel to the direction of displacement of the connection part within the housing part against the spring element.

According to an embodiment, it is proposed that the first connection part is supported at a radially inwardly facing collar at the front opening of the housing part within the housing part. This collar preferably leads to a preload of the spring element. The spring element is hinged to the connection part in such a way that it exerts a spring force on the connection part in the direction of the end-face opening of the housing part. The collar fixes or supports the connection part inside the housing part. The spring element can first be inserted into the housing part through the front opening. The connection part is then pressed against the spring element through the front opening and pushed into the housing part.

To fix the connection part inside the housing element, the collar can then be placed on the front opening of the housing part and latched to the housing part. For this purpose, the collar can in particular have a circumferential lateral surface which rests against the inner lateral surface of the receptacle of the housing part and latches there in the installed state. For this purpose, a latching of the recess and projection between the lateral surface of the collar and the inner lateral surface of the housing part can be provided. The circumferential lateral surface of the collar can be arranged in an annular space between the outer lateral surface of the first connection part and the inner lateral surface of the first housing part. The collar fixes the connection part in its translatory movement along the longitudinal axis in the direction of the front opening, so that the connection part is arranged in the first housing part in such a way that it cannot be lost. In the direction of the bottom of the housing part, the spring element acts on the connection part and a force against the spring force must be applied to push the connection part away from the collar in the direction of the bottom of the first housing part.

According to one embodiment, it is proposed that the spring element is supported between a bottom of the first housing part and an at least partially circumferential, radially outwardly facing shoulder of the first connection part. The first connection part may have two areas that have different outer diameters. In the installed state, the first region lies in the direction of the front opening of the first housing part and has an outer diameter that corresponds approximately to the inner diameter of the housing part. The second area of the connection part can have a smaller diameter and thus be formed in the form of a step or a recess. The spring element may be arranged in the space formed between the connection part and the first housing part and may be hinged to the step. In the connected state of the connector, the spring element is compressed and presses against the shoulder with a spring force parallel to the longitudinal axis, so that the first connection element is pressed in the direction of the front opening of the first housing part.

According to one embodiment, it is proposed that a circumferential seal is arranged on an outer lateral surface of one of the housing parts, which seal is in contact with an inner lateral surface of the other housing part in the connected state, or that a circumferential seal is arranged on an inner lateral surface of one of the housing parts, which seal is in contact with an outer lateral surface of the other housing part in the connected state, or that a circumferential seal is arranged between an inner lateral surface of one of the housing parts and an outer lateral surface of the other housing part. A gap that may form between an outer lateral surface of a first housing part and an inner lateral surface of the other housing part in the connected state can be sealed by this seal, so that the connection between the sleeve-shaped receptacle and the plug-in element is protected against environmental influences.

According to an embodiment, it is proposed that the second connection part is attached to an electrical conductor, in particular to a solid conductor, in a material-locking manner. The electrical conductor, in particular a flat conductor, can be stripped at an end face or in its course. In the area of the stripping, the plug-in element can be arranged on a wide surface of the flat conductor in the form of a bolt, in particular welded or screwed on. This bolt can then serve as the plug-in element.

It is proposed that the second housing part has a conductor receptacle for receiving the conductor, in particular that the conductor receptacle is continuous and receives the conductor along its direction of propagation. The second housing part can receive the conductor. For this purpose, the conductor receptacle can have a cover which is arranged in a hinged manner, in particular in the form of a film hinge on the rest of the housing part. The conductor is inserted into the conductor receptacle, in particular with its stripped area. The insulation of the conductor is also located in the area of the conductor receptacle. The cover of the conductor receptacle can then be placed on the conductor on the other side of the conductor facing away from the remainder of the second housing part, thus closing the conductor receptacle in the form of a cover. Seals can be provided all around the conductor receptacle in the area of the entries for the conductor so that no moisture can enter the conductor receptacle in the longitudinal direction of the conductor. The cover of the conductor receptacle can be fixed to the rest of the second housing part in a sealed manner, in particular by clipping or latching.

Starting from the conductor receptacle, the housing part preferably extends in a surface normal to the broad surface of the conductor. In particular, the conductor receptacle extends perpendicular to the longitudinal axis of the second housing part. The longitudinal axis of the second housing part and the conductor receptacle or the conductor inserted in the conductor receptacle extend at an angle, preferably perpendicular to each other.

According to one embodiment, it is proposed that an insulator is arranged on the second connection part, covering the end face. The second connection part is preferably the plug-in element. This plug-in element is arranged in the second housing part. For protection against contact, it may be useful to insulate this plug-in element on the end face inside the housing, so that unintentional contact with the plug-in element on its end face is avoided.

According to one embodiment, it is proposed that the insulator has an opening formed to receive the spacer, in particular that the opening is coaxial with the recess of the plug-in element. In this way, the insulator provides protection against contact on the one hand, and on the other hand it enables the plug-in element and the receptacle with spacer to be plugged together.

According to one embodiment, it is proposed that a fixing lever is arranged on one of the housing parts, which can be pivoted about an axis perpendicular to the longitudinal axis and, in the connected state, engages with a fixing means on the other housing part. This ensures that the connection parts are fixed to each other in the longitudinal direction.

The housing parts are inserted into one another and fixed to one another at least in the direction of the longitudinal axis by means of the fastening lever and fastening means.

BRIEF DESCRIPTION OF THE DRAWINGS

In the following, the subject matter is explained in more detail with reference to drawings showing embodiments. The drawing show.

DETAILED DESCRIPTION OF SPECIFIC EMBODIMENTS

Figure 1:
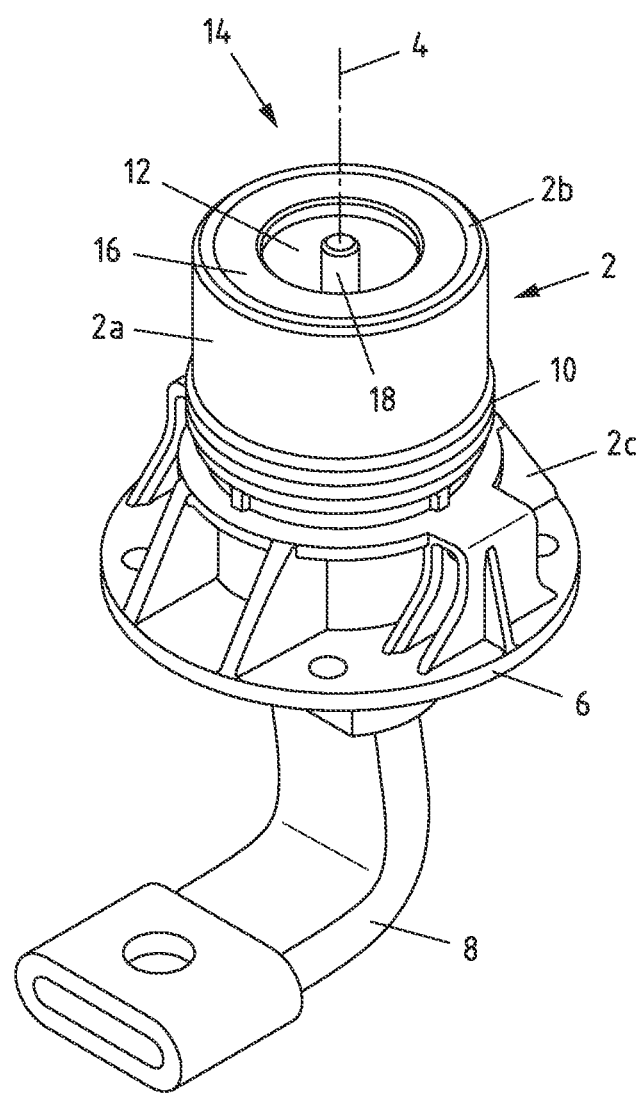
FIG. 1 a view of a first housing part.

FIG. 1 shows a first housing part 2 of an on-board power supply connector. The housing part 2 extends along a longitudinal axis 4 in a longitudinal direction. The first housing part 2 has an outer lateral surface 2a and is bounded by an end face 2b. On the side opposite the end face 2b, in particular on a bottom 2c of the first housing part, a flange 6 can project radially from the outer lateral surface 2a. In the region of the bottom 2c, the housing part 2 has a through opening through which a flexible cable 8 is guided.

A circumferential seal 10 may be provided between the end face 2b and the base 2c on the outer lateral surface 2a.

A connection part 12 is provided inside the housing part 2. The connection part 12 extends towards an opening 14 at the end face 2b. The connection part 12 is attached to a collar 16. The connection part 12 can be moved parallel to the longitudinal axis 14 within the housing part 2. A spacer 18 may be provided inside the connection part 12, which may be metallic or non-metallic.

Figure 2:
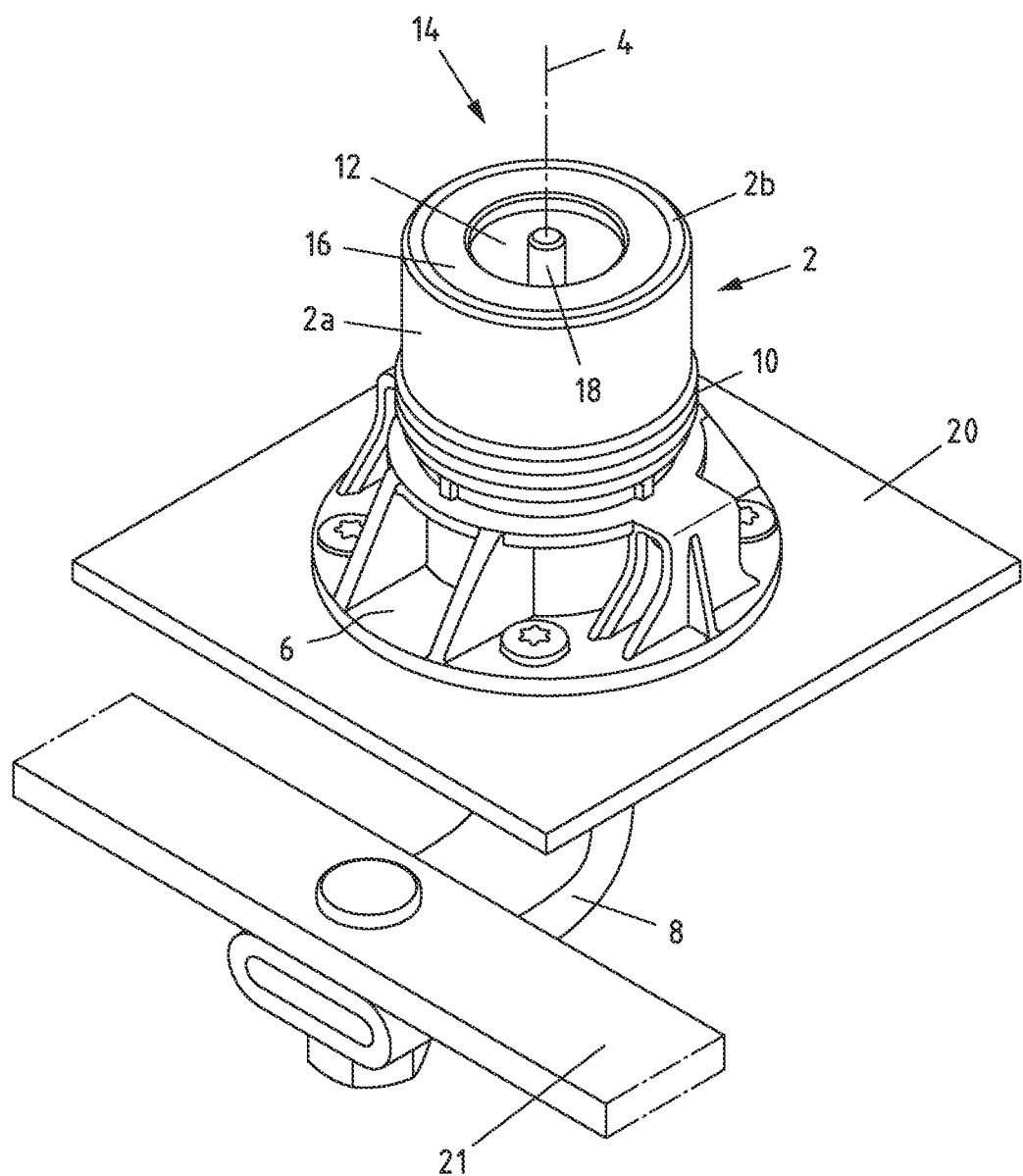
FIG. 2 the first housing part at a connection console.

For mounting the on-board power supply connector, for example in the area of a cable bushing, an underbody bushing, an entry into a housing or the like, the flange 6 can be screwed to an add-on part 20, as shown in FIG. 2. The attachment part 20 may be a body panel, a body floor, a housing wall, an inner wall or the like of a motor vehicle. The cable 8 may be guided through the add-on part 20 and connected, for example, to a rigid or flexible flat conductor 21.

Figure 3:
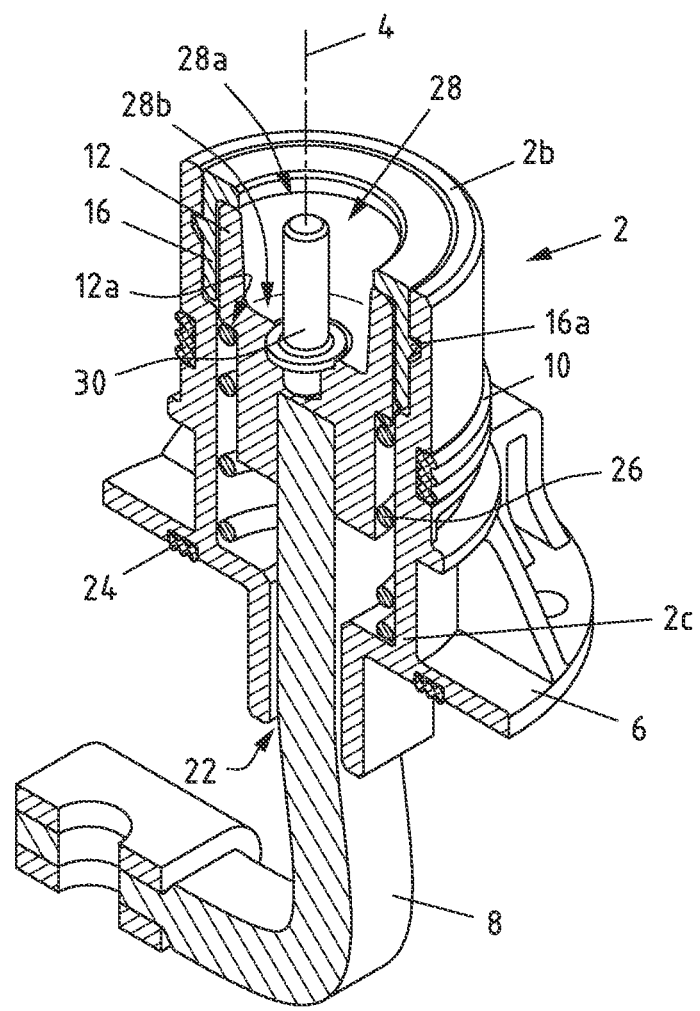
FIG. 3 a longitudinal section through a first housing part.

The internal structure of the housing part 2 is shown in FIG. 3 in a longitudinal section. It can be seen that the housing part 2 extends along the longitudinal axis 4 in the longitudinal direction. In the region of the bottom 2c of the housing part 2, the cable bushing 22 is provided, through which the cable 8 is guided into the interior of the housing part 2, preferably in a sealed manner. The cable 8 is arranged in the cable bushing 22 so as to be displaceable along the longitudinal axis 4. A seal 24 may be provided on the bottom side of the flange 6, this seal 24 being in contact with the attachment part 20 in the connected state and effecting a seal on the flange 6 via this.

The housing part 2 is sleeve-shaped in its interior. Inside the housing part 2, which may be formed as a hollow cylinder, for example, a spring 26 may abut the base 2c. The spring 26 extends inside the housing part 2 along the longitudinal axis 4. Starting from the base 2c, the connection part 12 is arranged in the housing part 2 following the spring 26. The connection part 12 has a shoulder 12a pointing radially outwards and thus has two areas with different diameters. The area with the smaller diameter is shaped in such a way that the spring 26 is movably arranged in an annular space between the connection part 12 and the inner lateral surface of the housing part 2. The spring 26 is struck by the shoulder 12a at which the region with the smaller diameter merges into the region with the larger diameter.

The connection part 12 further extends in the direction of the end face 2b. In the region of the end face 2b, the end face of the connection part 12 is abutted against the collar 16.

To assemble the housing part 2, the spring 26 is first inserted into the opening on the end face. Subsequently, the connection part 12 is placed with its shoulder 12a on the spring 26 and the spring 26 is preferably pretensioned. By being pushed in along the longitudinal axis 4, the connection part 12 enters entirely into the interior of the housing part 2. The collar 16 is then latched into the interior of the housing part 2 by means of a latching lug 16a. The collar 16 fixes the connection part 12 inside the housing part 2. However, the connection part 12 can be pressed longitudinally against the spring force of the spring 26 towards the bottom 2c of the housing part 2.

The connection part 12 has a receptacle 28 on its side facing away from the cable 8. The receptacle 28 has a bottom 28a and an end opening 28b. The receptacle 28 extends towards the base 28a in a conical shape. A spacer 30 can be arranged in the receptacle 28 at the base 28a, in particular in the region of the shoulder 12a. The receptacle 28 as well as the spacer 30 extend parallel to each other in the longitudinal axis 4.

Figure 4:
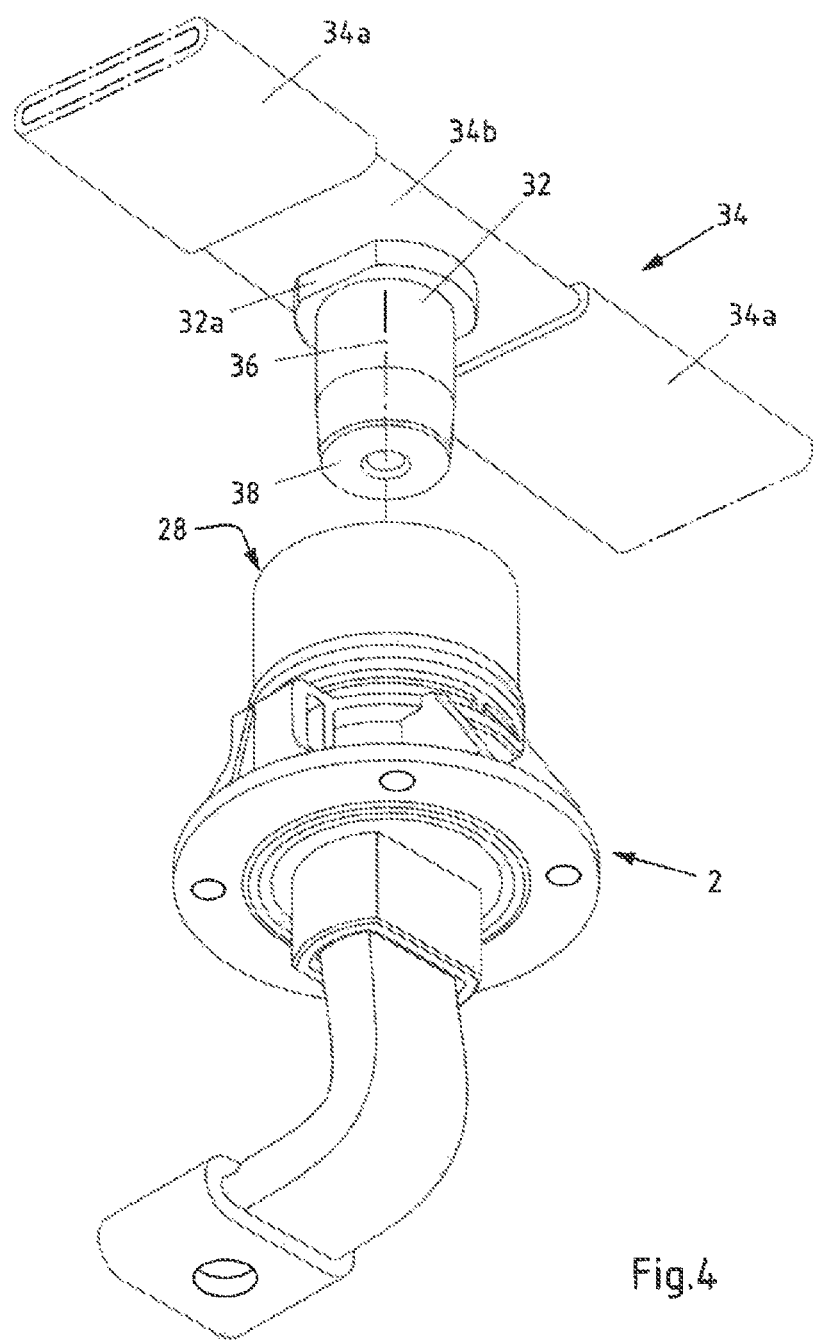
FIG. 4 an arrangement between a first housing part and a plug-in element.

Corresponding to the receptacle 28, the on-board power supply connector has a plug-in element 32, as shown in FIG. 4. FIG. 4 shows the housing part 2 according to FIG. 1. Opposite the receptacle 28, the plug-in element 32 may be arranged on a flat cable 34. The flat cable 34 may be stripped of insulation 34a at the end (not shown) or along its length, and bare conductor 34b is exposed. The plug-in element 32 may be attached to this bare conductor 34b, in particular friction welded thereto, for example. The flat member 34 extends along a longitudinal axis 36. The longitudinal axis 36 is in particular parallel to the surface normal on the surface on which the plug-in element 32 is attached to the flat cable 34.

An insulator 38 may be provided on the plug-in element 32 at an end surface which faces the housing portion 2 in the installed state. The insulator 38 may rest as a cap-shaped element on the end face of the plug-in element 32 and have a through opening.

Figure 5:
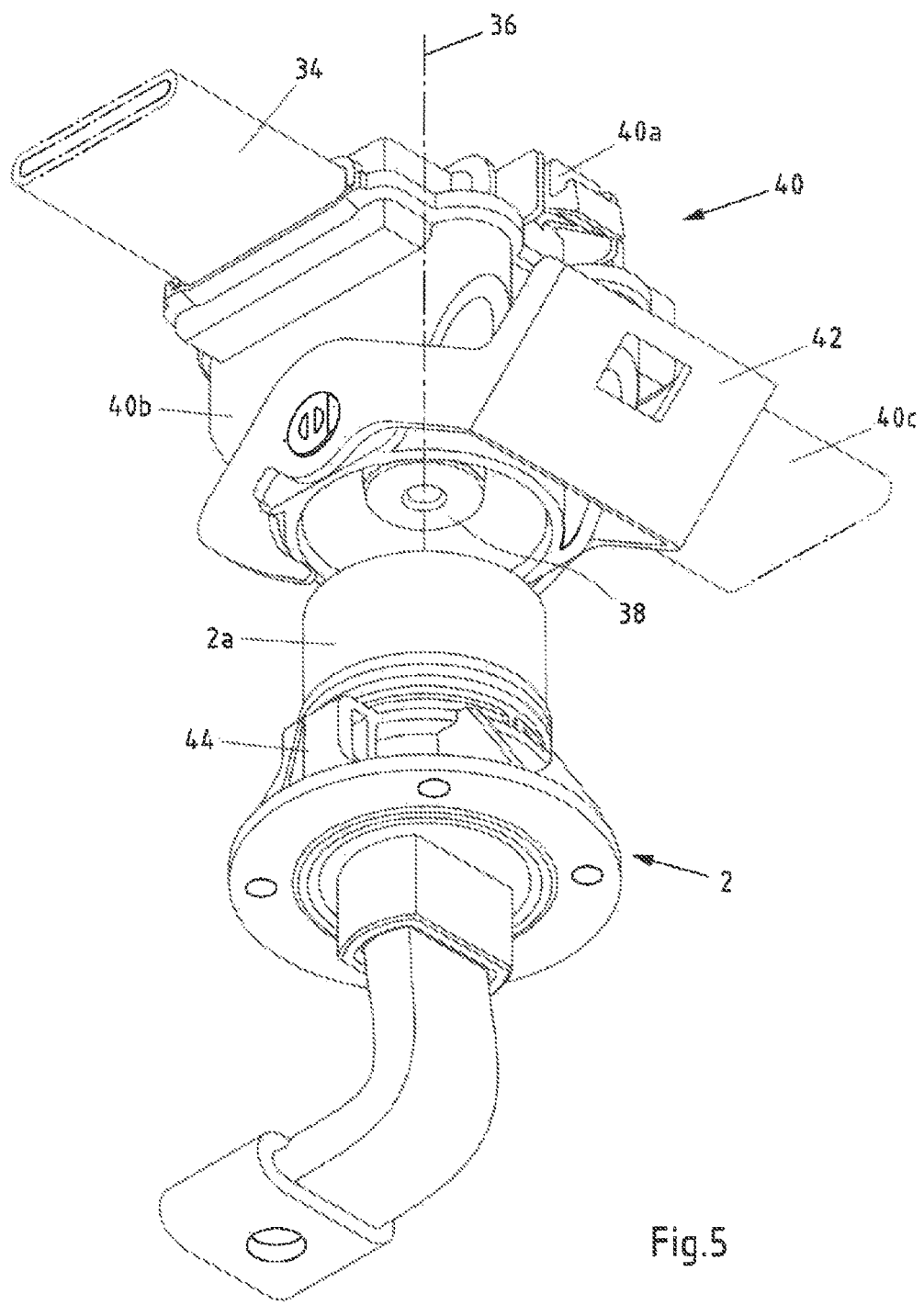
FIG. 5 a first plug-in element in a second housing part.

The plug-in element 32 together with the insulator 38 is received by a second housing part 40, as shown in FIG. 5. The second housing part 40 may include a cover 40a and a mating portion 40b. The plug-in region 40b is formed to receive the first housing part 2 and has an opening extending parallel to the longitudinal axis 36. Within this opening, the plug-in element 32 extends, preferably concentrically with the opening. In the region of the opening, the plug-in element 40b has an inner lateral surface 40c which is congruent with the outer lateral surface 2a of the first housing part 2.

Starting from a flange 32a according to FIG. 4, the plug-in element 32 has a tapered shape in the direction of the insulator 36. In particular, the outer lateral surface of the plug-in element 32 is congruent with the inner lateral surface of the receptacle 28.

The flat cable 34 is sealingly received in the region of the bare conductor 34b by the cover 40a of the housing part 40. For this purpose, the cover 40a can be hinged to the plug-in area 40b in the form of a hinge, in particular with a film hinge, and can be connected thereto in a latching manner.

A fastening lever 42 can be provided on the housing part 40. In this case, the fastening lever is hinged to the outer lateral surface of the plug-in area 40. The fastening lever 42 is pivotally mounted to the housing portion 40 about an axis perpendicular to the longitudinal axis 36. The fastening lever 32 interacts with a receptacle 44 on the first housing part 2 so that the housing parts 2, 40 can be fixed to each other in the direction of the longitudinal axis 36/4.

Figure 6:
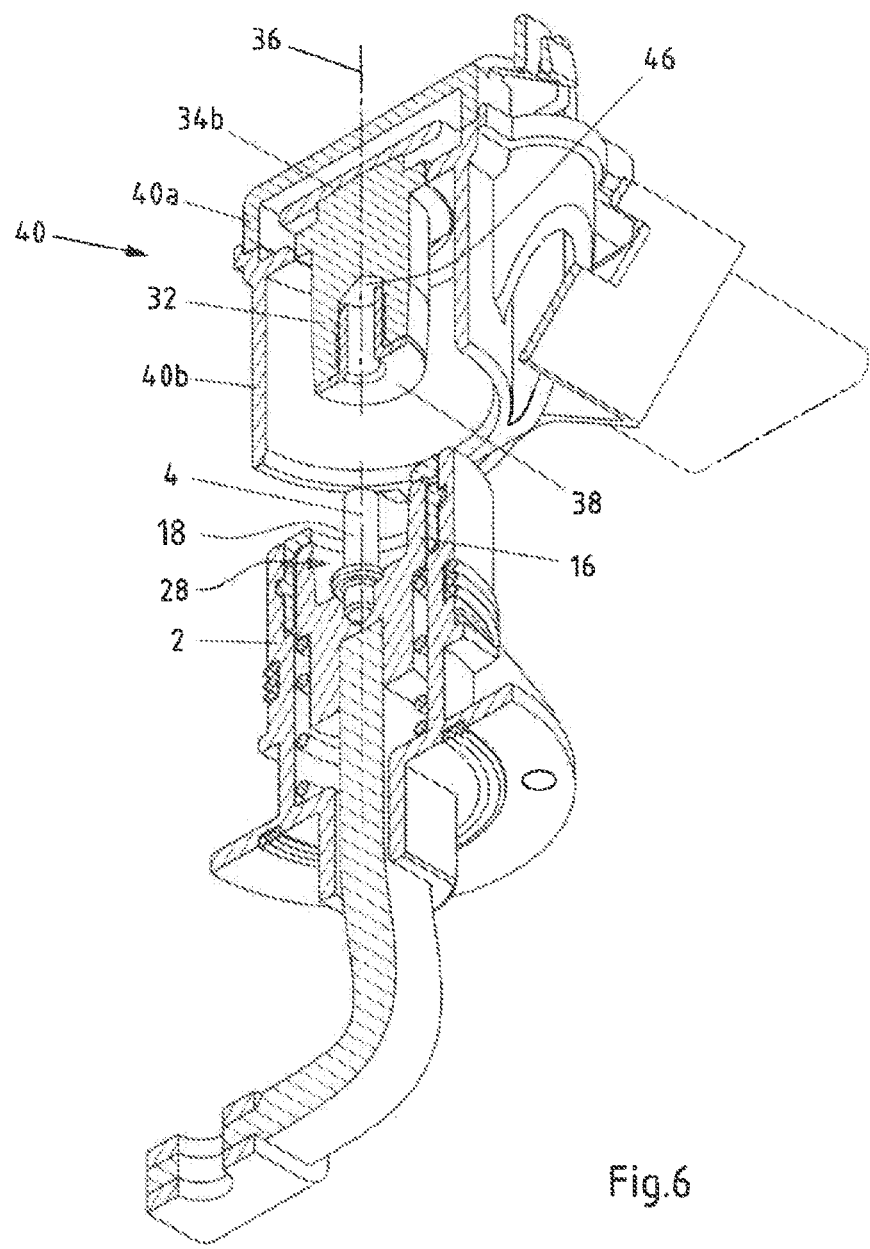
FIG. 6 a sectional view through an on-board power supply connector in an unconnected state.

FIG. 6 shows the two housing parts 2, 40 in a longitudinal section. It can be seen that the plug-in area 40a receives the plug-in element 32 in a sealed manner on the bare conductor 34b. A hole 46 may be provided within the plug-in element 32. The insulator 38 covers the mating element 32 on its face and extends into the bore 46. The bore 46 corresponds to the spacer 18. The spacer 18 extends along the longitudinal axis 4 and the bore 36 extends along the longitudinal axis 36. To join the two housing parts 2, 40, the housing part 2 is inserted into the opening of the housing part 40. Here, the spacer 38 comes into engagement with the bore 46. The inner lateral surface of the receptacle 28 comes into contact with the outer lateral surface of the plug-in element 32. The connection part 12 is pushed onto the plug-in element 32 until the spacer 18 abuts against the bottom of the bore 46.

Figure 7:
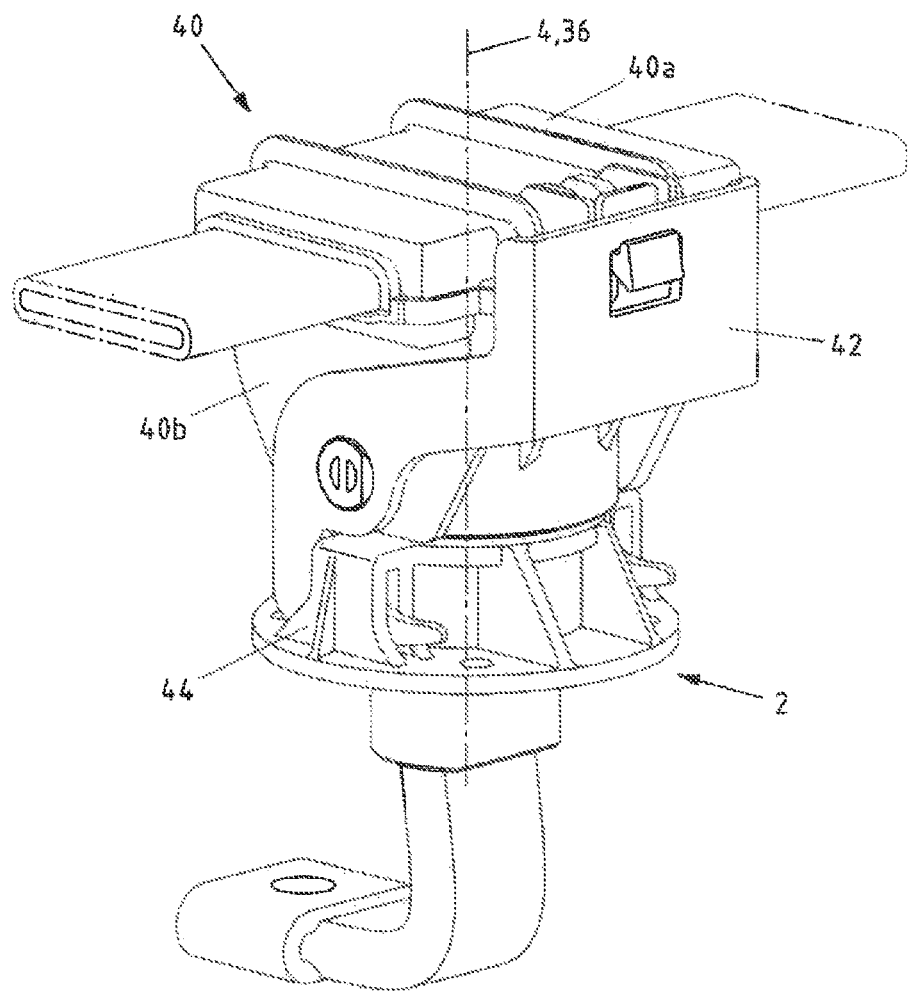
FIG. 7 a view of an on-board power supply connector in the connected state.

In the assembled state, the fastening lever 42, as shown in FIG. 7, is folded over and comes into engagement with the receptacles 44. This fixes the two housing parts 2, 40 relative to the longitudinal axis 4, 36, which are collinear in the assembled state.

Figure 8:
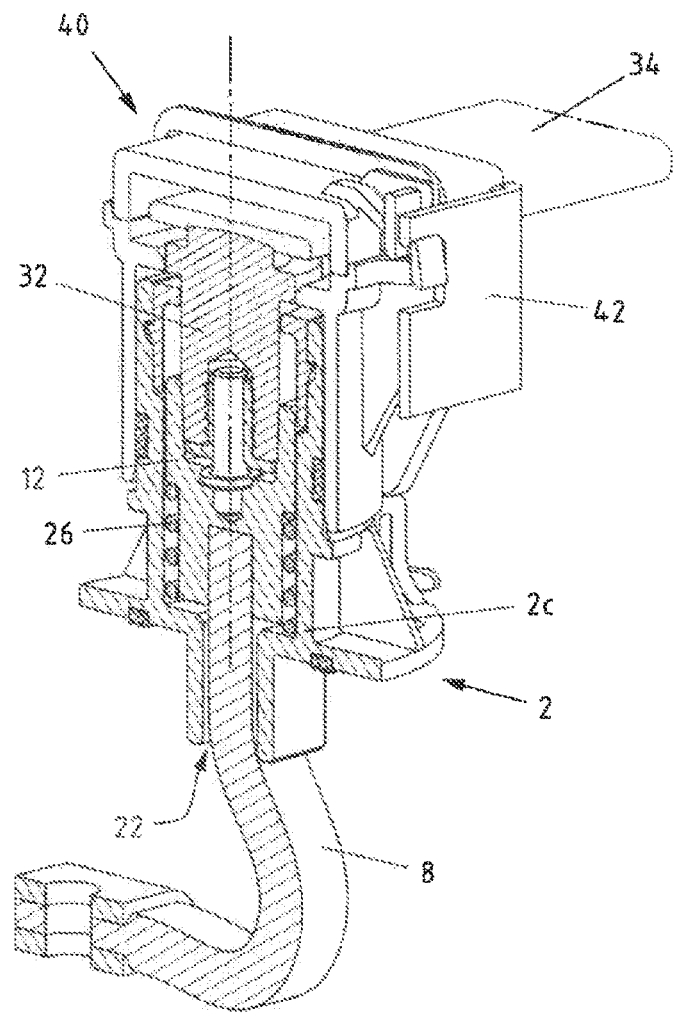
FIG. 8 a sectional view through an on-board power supply connector in the connected state.

As can be seen in FIG. 8, in the assembled state the connection part 12 is slid over the plug-in element 32. The outer lateral surface of the plug-in element 32 is in direct contact with the inner lateral surface of the receptacle 28 of the connection part 12. As a result of being pushed together, the spring 26 is compressed compared to the unassembled state. The spring 26 exerts a force in the direction of the plug-in element 32 on the connection part 12. This results in an intimate, dynamically stable and permanent contact between the connection part 12 and the plug-in element 32, so that a good electrical transition is made possible. When pushed together, the connection part 12 is moved in the direction of the base 2c. In the process, the cable 8 is also moved through the cable bushing 22.

Figure 9:
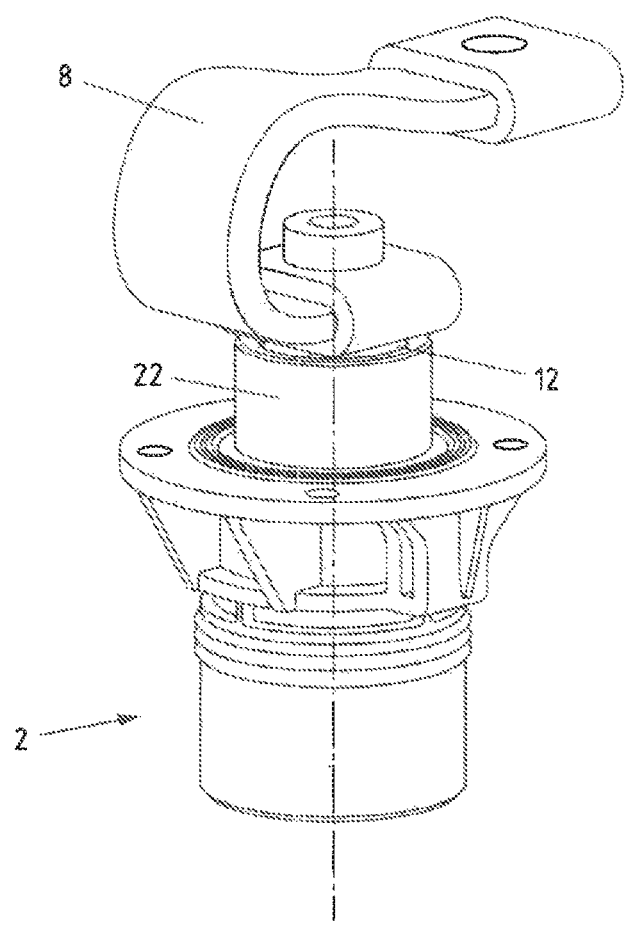
FIG. 9 a first housing part according to a second embodiment.

FIG. 9 shows another alternative of a first housing part 2. Here, the cable 8 is attached to the connection part 12 outside the housing part 2 and the connection part 12 is movably arranged in the cable bushing 22. This is shown again in FIG. 10. The cable 8 is electrically and mechanically connected to the connection part 12 outside the housing part 2. The connection part 12 can be moved parallel to the longitudinal axis 4 within the housing part 2, whereby this movement can tension the spring 26.

Figure 10:
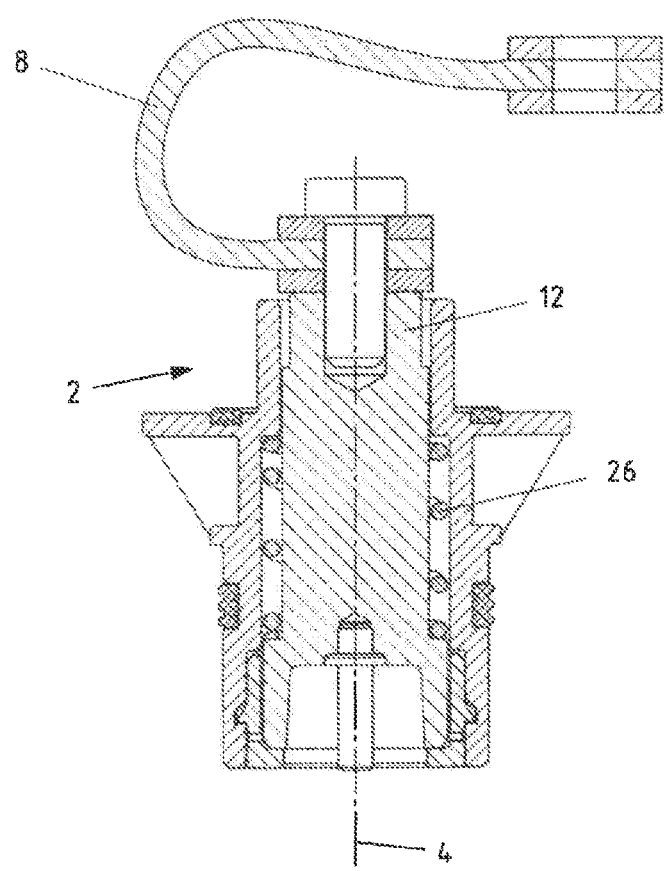
FIG. 10 a sectional view through a first housing part in the unconnected state.
Figure 11:
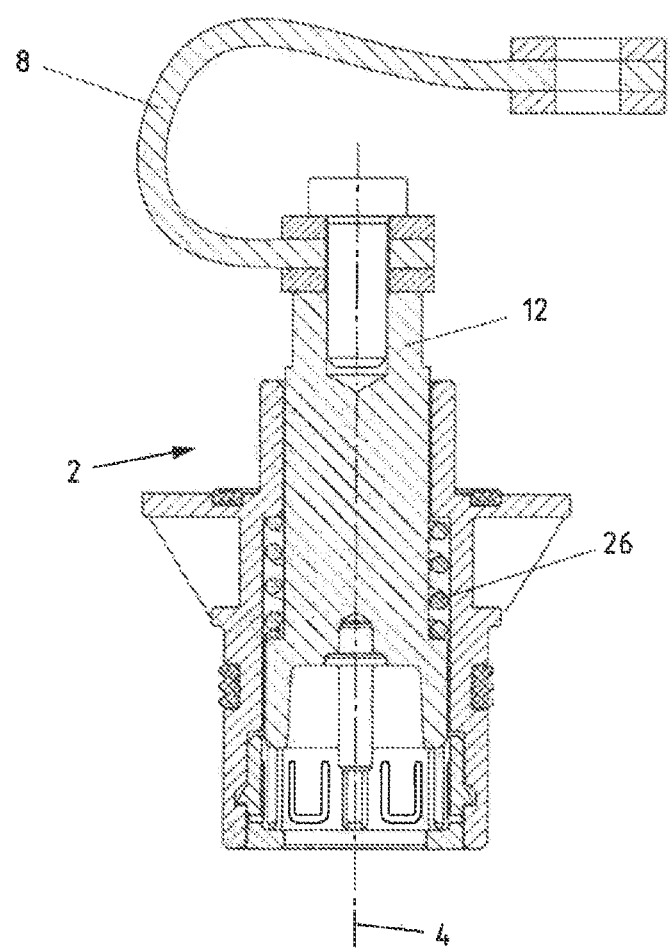
FIG. 11 a sectional view through a first housing part in the connected state.

FIG. 11 shows the first housing part 2 according to FIG. 9 in the installed state, i.e. when the spring 26 is compressed. It can be seen that, compared to FIG. 10, the connection part 12 has been pushed out of the housing part 2 in parts. The spring 26 is compressed.

Figure 12:
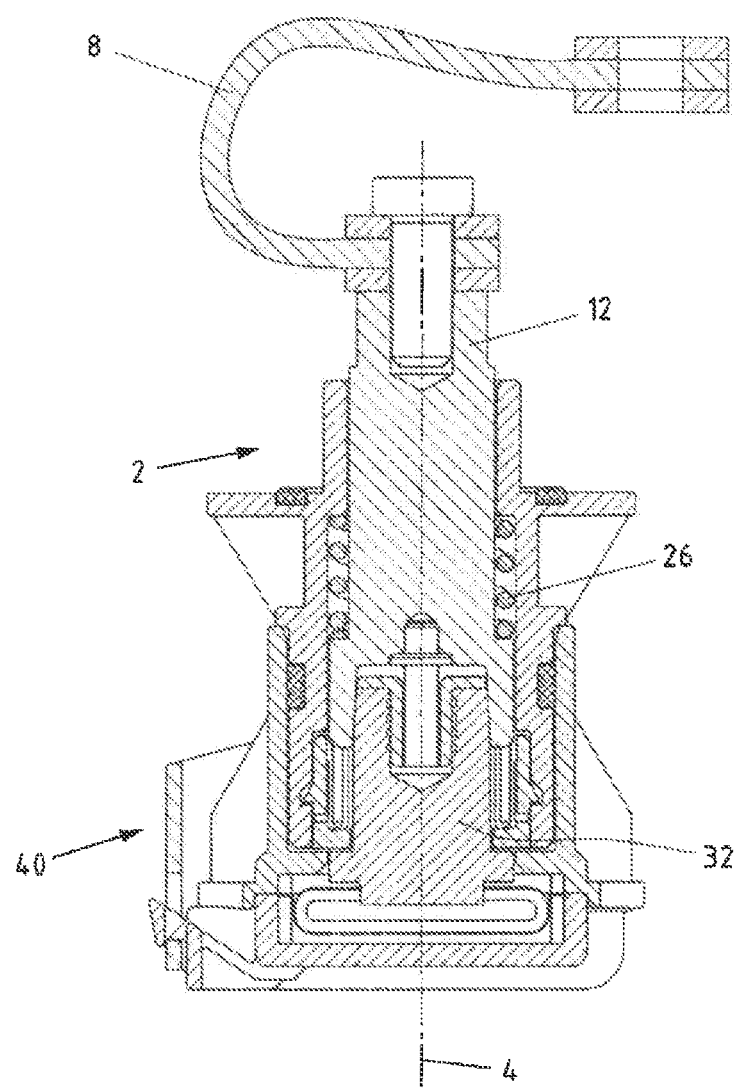
FIG. 12 a sectional view of a battery connector according to a second embodiment in the connected state.

FIG. 12 shows the connector according to FIGS. 9-11 in a longitudinal section in the assembled state. Here it can be seen that in this state the plug-in element 32 is received within the receptacle of the connection part 12. The spring 26 presses the connection part 12 in the direction of the plug-in element 32. The housing parts 2, 40 are fixed relative to each other by the fixing lever 42.

Figure 13:
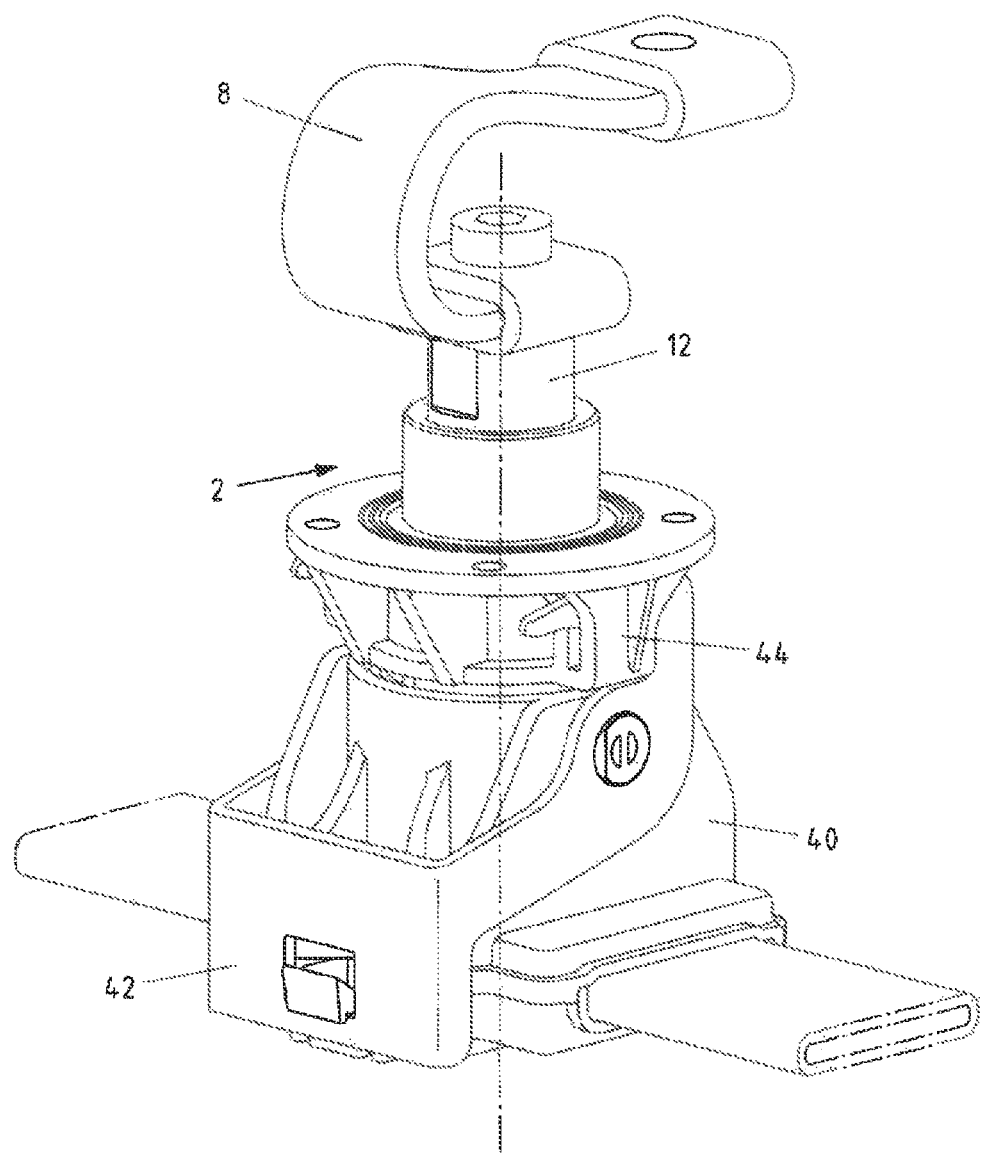
FIG. 13 a view of an on-board power supply connector in the connected state.

FIG. 13 shows the connector according to FIG. 12 in a view. The fixing of the fastening lever 42 to the receptacles 44 can be seen, so that the two housing parts 2, 40 are fixed relative to each other. The connection part 12 is pressed out of the housing part 2 at least in parts.

LIST OF REFERENCE SIGNS

2 Housing part
2a Outer lateral surface
2b End face
2c Base
4 Longitudinal axis
6 Flange
8 Cable
10 Gasket/Seal
12 Connection part
12a Shoulder
14 Opening
16 Collar
18 Spacer
20 Assembly part
21 Flat conductor
22 Cable bushing
24 Gasket/Seal
26 Spring
28 Mounting
30 Spacer
32 Plug-in element
34 Flat cable
34a Insulation
34b Bare conductor
36 Longitudinal axis
38 Insulator
40 Housing part
40a Cover
40b Plug-In area
40c Inner lateral surface
42 Mounting lever
44 Mountings
46 Bore

What is claimed is:

1. On-board power supply connector, in particular for high-voltage on-board power supplies, comprising,
   a first connection part arranged in a first housing part, wherein the first housing part has a longitudinal extension along a longitudinal axis and has an opening on an end face thereof, and the first connection part is spring-mounted in the first housing part along the longitudinal axis by a spring element such that it can be moved along the longitudinal axis;
   a second connection part arranged in a second housing part, wherein the second housing part has a longitudinal extension along a longitudinal axis and has an opening on an end face thereof;
   wherein in a connected state of the connector
      the longitudinal axes of the first and second housing parts are collinear, and
      the second housing part is fixed relative to the first housing part at least in the longitudinal direction and the second connection part is in mechanical contact with the first connection part,
   wherein the spring element is compressed in the connected state, such that a permanent spring force acts on the connection between the connection parts, and
   wherein the second connection part is arranged on a stripped broad surface of a flat conductor, and the second connection part has a conductor receptacle for receiving the flat conductor and the conductor receptacle has, in its bushing area for the flat conductor, a circumferential seal.

2. On-board power supply connector of claim 1, wherein
   one of the connection parts has a sleeve-shaped receptacle and one of the connection parts has a rod-shaped plug-in element congruent with the sleeve-shaped receptacle and/or
   in the connected state, the plug-in element is inserted in the sleeve-shaped receptacle and the spring element is compressed and/or
   in the connected state, one of the housing parts is at least partially inserted into the end-face opening of the other of the housing parts, in particular
      in the connected state, the first housing part is inserted into the end-face opening of the second housing part, or
      in the connected state, the second housing part is inserted into the end-face opening of the first housing part.

3. On-board power supply connector of claim 2, wherein the sleeve-shaped receptacle tapers from the end-face opening toward a base thereof, in particular tapers conically, and/or in that the plug-in element tapers toward its end face, in particular tapers conically.

4. On-board power supply connector of claim 2, wherein, in the connected state, an inner lateral surface of the sleeve-shaped receptacle and an outer lateral surface of the plug-in element are in direct contact with one another.

5. On-board power supply connector of claim 2, further comprising a spacer that extends in the sleeve-shaped receptacle from the base of the receptacle to the end-face opening of the sleeve-shaped receptacle, in particular in that the spacer extends in the form of a rod in the interior of the sleeve-shaped receptacle.

6. On-board power supply connector of claim 5, wherein the plug-in element has a recess, extending from the end face of the plug-in element in the longitudinal axis, for the spacer of the sleeve-shaped receptacle, and in that, in the connected state, the spacer is inserted in the recess, in particular in that the spacer is inserted up to a stop in the recess.

7. On-board power supply connector of claim 5, wherein the first connection part is connected to a flexible cable, wherein
   the flexible cable is inserted through a bushing into the interior of the first housing part and is movably mounted in the bushing along the longitudinal axis, or
   the first connection part is led out of the interior of the first housing part through a bushing and is mounted movably in the bushing along the longitudinal axis.

8. On-board power supply connector of claim 5, wherein the first connection part is mounted on a radially inwardly facing collar on the end-face opening of the first housing part, in particular in that the inwardly facing collar is arranged in an annular space between the outer lateral surface of the first connection part and the inner lateral surface of the first housing part and, in particular, is mounted on the first housing part in a fixed manner relative to the longitudinal axis.

9. On-board power supply connector of one claim 5, wherein the spring element is mounted between a base of the first housing part and an at least partially circumferential, radially outwardly pointing shoulder of the first connection part and, in the connected state, is compressed towards the base of the housing part and thus exerts a spring force parallel to the longitudinal axis in the direction of the shoulder on the first connection part.

10. On-board power supply connector of claim 5, wherein a circumferential seal is arranged on an outer lateral surface of one of the housing parts, the circumferential seal is in contact with an inner lateral surface of the other housing part in the connected state.

11. On-board power supply connector of claim 5, wherein the second connection part is fastened to the flat conductor, in particular to a solid material conductor.

12. On-board power supply connector of claim 5, wherein the conductor receptacle is continuous and receives the conductor along its propagation direction.

13. On-board power supply connector of claim 5, wherein the conductor receptacle extends perpendicularly to the longitudinal axis of the second housing part.

14. On-board power supply connector of claim 5, further comprising an insulator, arranged on the end face and covering the end face, and which is arranged on the second connection part.

15. On-board power supply connector of claim 14, wherein the insulator has an opening formed to accommodate the spacer, in particular in that the opening is coaxial with the recess of the plug-in element.

16. On-board power supply connector of claim 14, further comprising a fastening lever arranged on one of the housing parts, which can be pivoted about an axis perpendicular to the longitudinal axis and, in the connected state, engages with a fastening means on the other housing part.

* * * * *